(12) United States Patent
Nomura et al.

(10) Patent No.: US 12,212,644 B2
(45) Date of Patent: *Jan. 28, 2025

(54) VEHICLE CONTROL SYSTEM, CONTROL METHOD, ELECTRONIC DEVICE, AND RECORDING MEDIUM

(71) Applicant: HONDA MOTOR CO., LTD., Tokyo (JP)

(72) Inventors: Takumi Nomura, Tokyo (JP); Tatsuroh Saitoh, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,908

(22) Filed: Aug. 25, 2023

(65) Prior Publication Data
US 2024/0106621 A1 Mar. 28, 2024

(30) Foreign Application Priority Data
Sep. 28, 2022 (JP) .................. 2022-155131

(51) Int. Cl.
*H04L 7/00* (2006.01)
*H04L 67/12* (2022.01)

(52) U.S. Cl.
CPC ............ *H04L 7/0008* (2013.01); *H04L 67/12* (2013.01)

(58) Field of Classification Search
CPC . H04L 2012/40215; H04L 67/12; H04W 4/48
See application file for complete search history.

(56) References Cited

U.S. PATENT DOCUMENTS 10,328,898 B2 * 6/2019 Golsch .................... B60R 25/20
2012/0140861 A1 6/2012 Menon et al.
(Continued)

FOREIGN PATENT DOCUMENTS

| JP | H9-83608 A | 3/1997 |
| JP | 2017-50730 A | 3/2017 |
| JP | 2019-125916 A | 7/2019 |

OTHER PUBLICATIONS

Japanese Office Action dated May 28, 2024 issued in corresponding Japanese application No. 2022-155131; English machine translation included (7 pages).
(Continued)

*Primary Examiner* — David R Lazaro
(74) *Attorney, Agent, or Firm* — Rankin, Hill & Clark LLP

(57) ABSTRACT

Provided is a vehicle control system that includes a first electronic device and a second electronic device. The first electronic device includes: a first timer unit; a generation unit that generates time information indicating time counted by the first timer unit; and a first transmission unit that transmits the time information to the second electronic device, and also transmits, to the second electronic device, elapsed time information indicating elapsed time from the start of generation of the time information till transmission of the time information generated. The second electronic device includes: a second timer unit; a reception unit; and an adjustment unit that adjusts time counted by the second timer unit based on the time information and the elapsed time information received by the reception unit.

7 Claims, 5 Drawing Sheets

(56) References Cited

U.S. PATENT DOCUMENTS

| | | | |
|---|---|---|---|
| 2014/0074320 A1* | 3/2014 | Nishida | B60H 1/00657 |
| | | | 701/2 |
| 2017/0064661 A1 | 3/2017 | Katagiri et al. | |
| 2018/0099643 A1* | 4/2018 | Golsch | G01S 13/765 |
| 2019/0082314 A1* | 3/2019 | Yukizaki | H04W 28/0226 |
| 2019/0222407 A1 | 7/2019 | Yoshida et al. | |
| 2020/0021611 A1* | 1/2020 | Maeda | H04L 63/1466 |
| 2021/0237669 A1 | 8/2021 | Toya | |
| 2023/0234538 A1* | 7/2023 | Golsch | G01S 5/04 |
| | | | 340/5.61 |
| 2024/0106620 A1* | 3/2024 | Nomura | H04L 12/4625 |
| 2024/0106621 A1* | 3/2024 | Nomura | H04L 7/0008 |
| 2024/0106676 A1* | 3/2024 | Nomura | H04L 12/40 |

OTHER PUBLICATIONS

Yuichi Tokunaga, et al., "A continuous time synchronization scheme of large scale wireless sensor networks", The bulletin of Multimedia, Distributed, Cooperative, and Mobile Symposium (DICOMO) 1997-2006 edition Ver 1.1 [DVD-ROM], Information Processing Society of Japan, Jul. 5, 2006, vol. 2006, p. 793-796 (4 pages).

Ryo Kurachi, et al., "Delivery Delay Mechanisms for Controller Area Network", The technical report of embedded systems(EMB), 2019-EMB-050, Information Processing Society of Japan, Mar. 10, 2019, p. 1-5 (5 pages).

* cited by examiner

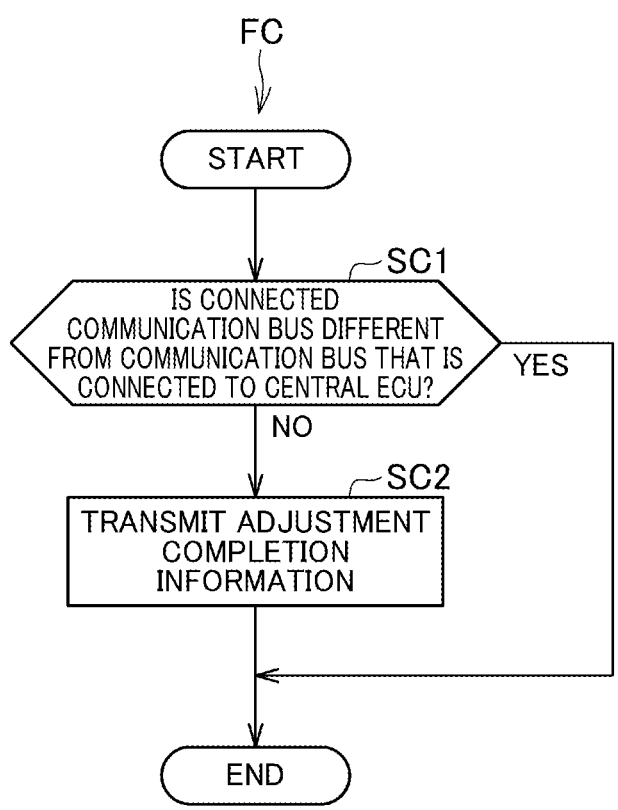

VEHICLE CONTROL SYSTEM, CONTROL METHOD, ELECTRONIC DEVICE, AND RECORDING MEDIUM

INCORPORATION BY REFERENCE

The present application claims priority under 35 U.S.C. § 119 to Japanese Patent Application No. 2022-155131 filed on Sep. 28, 2022. The content of the application is incorporated herein by reference in its entirety.

BACKGROUND OF THE INVENTION

Field of the Invention

The present invention relates to a vehicle control system, a control method, an electronic device, and a recording medium of the vehicle control system.

Description of the Related Art

Conventionally, there are technologies for implementing time synchronization between electronic devices. For example, Japanese Patent Laid-Open No. 2019-125916 discloses a technology with which a master control device and a slave control device perform time synchronization. In Japanese Patent Laid-Open No. 2019-125916, the master control device transmits a timing synchronization message storing global time to the slave control device, and the slave control device performs time setting based on the global time extracted from the timing synchronization message.

However, in the method disclosed in Japanese Patent Laid-Open No. 2019-125916, elapsed time, which is from the start of generation of a timing synchronization message to transmission of the timing synchronization message, is not taken into consideration for time synchronization. Thus, there is still room for improvement in the precision of time synchronization.

The present invention is designed in view of the aforementioned circumstance, and it is an object thereof to enable time synchronization between electronic devices with high precision.

SUMMARY OF THE INVENTION

One aspect of the present invention is a vehicle control system that includes a first electronic device and a second electronic device connected to the first electronic device, in which the first electronic device includes: a first timer unit; a generation unit that generates time information indicating time counted by the first timer unit; and a first transmission unit that transmits the time information generated by the generation unit to the second electronic device, the first transmission unit also transmitting, to the second electronic device, elapsed time information indicating elapsed time from when the generation unit starts generation of the time information till transmitting the time information generated, and the second electronic device includes: a second timer unit; a reception unit that receives the time information and the elapsed time information; and an adjustment unit that adjusts time counted by the second timer unit based on the time information and the elapsed time information received by the reception unit.

According to one aspect of the present invention, it is possible to implement time synchronization between the electronic devices with high precision.

BRIEF DESCRIPTION OF THE DRAWINGS

FIG. 5 is a flowchart showing operations of the connection ECU.

DETAILED DESCRIPTION OF THE PREFERRED EMBODIMENTS

1. First Embodiment

First, a first embodiment will be described.

Figure 1:
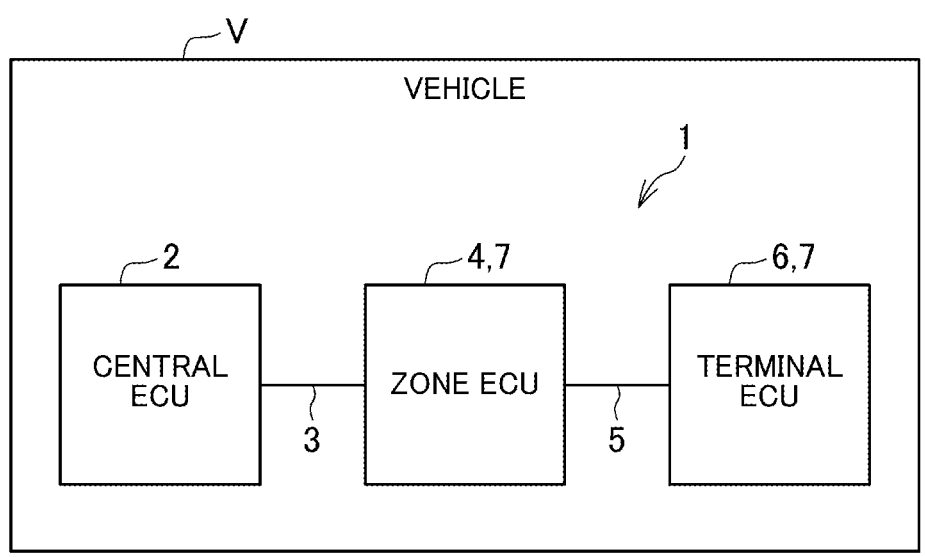
FIG. 1 is a diagram showing a configuration of a vehicle control system.

FIG. 1 is a diagram showing the configuration of a vehicle control system 1 that controls a vehicle V1.

The vehicle control system 1 is a system that controls the vehicle V. The vehicle control system 1 includes a central ECU (Electronic Control Unit) 2 that performs overall control and information processing of the vehicle V. The central ECU 2 executes OTA (Over The Air) management. The OTA management includes control regarding processing for downloading an update program of an in-vehicle device provided in the vehicle V from a server outside the vehicle and processing for applying the downloaded update program to the in-vehicle device.

The central ECU 2 corresponds to a "first electronic device" and an "electronic device" of the present disclosure.

A zone ECU 4 is connected to the central ECU 2 via a first communication bus 3. The first communication bus 3 is a communication bus complying with CAN standards. The zone ECU 4 controls a terminal ECU 6 that is connected thereto via a second communication bus 5. Like the first communication bus 3, the second communication bus 5 is a communication bus complying with the CAN standards. From the viewpoint of the terminal ECU 6, the second communication bus 5 is a communication bus to which the central ECU 2 is connected via the zone ECU 4 and the first communication bus 3. In the meantime, from the viewpoint of the zone ECU 4, the second communication bus 5 is a communication bus to which the central ECU 2 is not connected.

As examples of the terminal ECU 6, there may be a VSA (Vehicle Stability Assist) device, a drive device that drives the vehicle V, an air conditioning device, and an ESL (Electronic Steering Lock). Note, however, that the terminal ECU 6 is not limited to those examples but, as will be described later, may be any ECU as long as it has a time counting function.

As shown in FIG. 1, to the central ECU 2, the zone ECU 4 is connected via the first communication bus 3, and terminal ECU 6 is connected via the first communication bus 3, the zone ECU 4, and the second communication bus 5. Thus, in the following description, when referring to the zone ECU 4 and the terminal ECU 6 without distinction, a general term "connection ECU" is used and a reference numeral "7" is applied thereto.

The connection ECU 7 corresponds to a "second electronic device" and "another electronic device" of the present disclosure.

Figure 2:
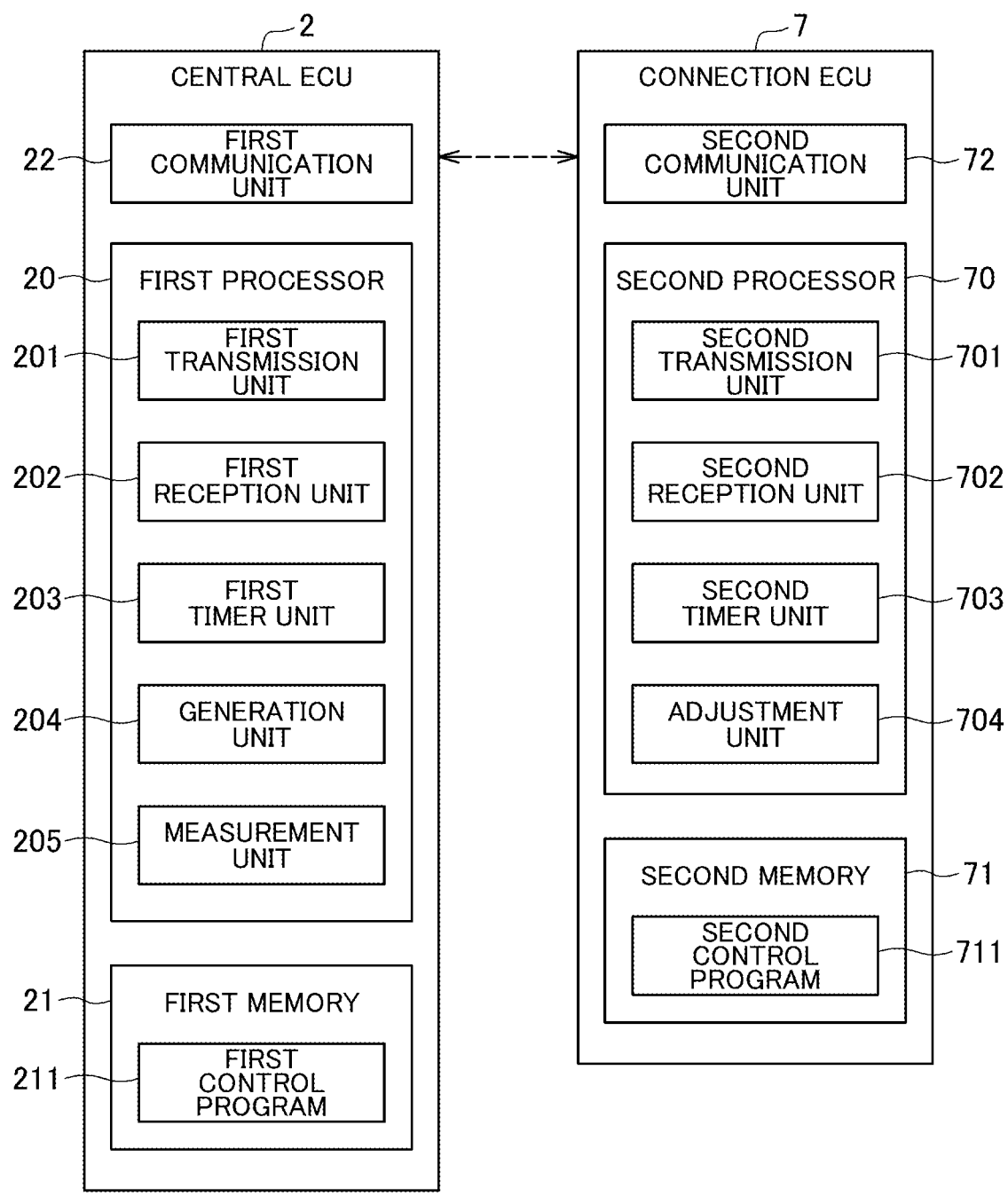
FIG. 2 is a block diagram showing configurations of a central ECU and a connection ECU.

FIG. 2 is a block diagram showing the configurations of the central ECU 2 and the connection ECU 7.

The central ECU 2 includes a first processor 20 such as a CPU (Central Processing Unit), a first memory 21, and a first communication unit 22.

The first processor 20 corresponds to a "processor" of the present disclosure.

The first memory 21 is a storage device that stores programs and data executed by the first processor 20. The first memory 21 is configured with a nonvolatile storage device such as a ROM (Read Only Memory), for example. The first memory 21 may also include a volatile storage device configuring a work area of the first processor 20, such as a RAM (Random Access memory), for example. The first memory 21 stores data to be processed by the first processor 20, and a first control program 211 to be executed by the first processor 20.

The first control program 211 corresponds to a "program" of the present disclosure.

The first communication unit 22 includes hardware such as a communication circuit and a connector complying with the CAN standards, and communicates with the connection ECU 7 under control of the first processor 20. The first communication bus 3 is connected to the first communication unit 22.

The first processor 20 functions as a first transmission unit 201, a first reception unit 202, a first timer unit 203, a generation unit 204, and a measurement unit 205 by reading out and executing the first control program 211 stored in the first memory 21.

The first timer unit 203 corresponds to a "timer unit" of the present disclosure. The first transmission unit 201 corresponds to a "transmission unit" of the present disclosure.

The first transmission unit 201 transmits information to the connection ECU 7 via the first communication unit 22.

The first reception unit 202 receives information from the connection ECU 7 via the first communication unit 22.

The first timer unit 203 counts the time. For example, the first timer unit 203 operates as an RTC (Real Time Clock), and counts the current time.

The generation unit 204 generates time information J1 indicating the time counted by the first timer unit 203. The generation unit 204 outputs the time information J1 generated to the first transmission unit 201. The first transmission unit 201 transmits the time information J1 received from the generation unit 204 to the connection ECU 7.

The measurement unit 205 measures the elapsed time. The elapsed time is the time elapsed from the start of generation of the time information J1 till transmission of the time information J1 generated. The measurement unit 205 measures the elapsed time by measurement means such as a counter, for example.

The connection ECU 7 includes a second processor 70 such as a CPU, a second memory 71, and a second communication unit 72.

The second memory 71 corresponds to a "storage unit" of the present disclosure.

The second memory 71 is a storage device that stores programs and data executed by the second processor 70. The second memory 71 is configured with a nonvolatile storage device such as a ROM, for example. The second memory 71 may also include a volatile storage device configuring a work area of the second processor 70, such as a RAM, for example. The second memory 71 stores data to be processed by the second processor 70, and a second control program 711 to be executed by the second processor 70.

The second communication unit 72 includes hardware such as a communication circuit and a connector complying with the CAN standards, and communicates with the central ECU 2 under control of the second processor 70. In a case where the connection ECU 7 is the zone ECU 4, the first communication bus 3 is connected to the second communication unit 72 to communicate with the central ECU 2 via the first communication bus 3. In a case where the connection ECU 7 is the terminal ECU 6, the second communication bus 5 is connected to the second communication unit 72 to communicate with the central ECU 2 via the first communication bus 3, the zone ECU 4, and the second communication bus 5.

In a case where the connection ECU 7 is the zone ECU 4, the second communication bus 5 is also connected to the second communication unit 72 in addition to the first communication bus 3. In a case where the connection ECU 7 is the terminal ECU 6, the second communication bus 5 is connected to the second communication unit 72.

The second processor 70 functions as a second transmission unit 701, a second reception unit 702, a second timer unit 703, and an adjustment unit 704 by reading out and executing the second control program 711 stored in the second memory 71.

The second reception unit 702 corresponds to a "reception unit" of the present disclosure.

The second transmission unit 701 transmits information to the central ECU 2 via the second communication unit 72.

The second reception unit 702 receives information from the central ECU 2 via the second communication unit 72.

The second timer unit 703 counts the time. For example, the second timer unit 703 operates as an RTC, and counts the current time. The time counted by the second timer unit 703 is adjusted by the adjustment unit 704.

The adjustment unit 704 adjusts the time counted by the second timer unit 703. Time adjustment performed by the adjustment unit 704 will be described by referring to FIG. 3 and FIG. 4.

Next, operations of the vehicle control system 1 according to the present embodiment will be described.

Figure 3:
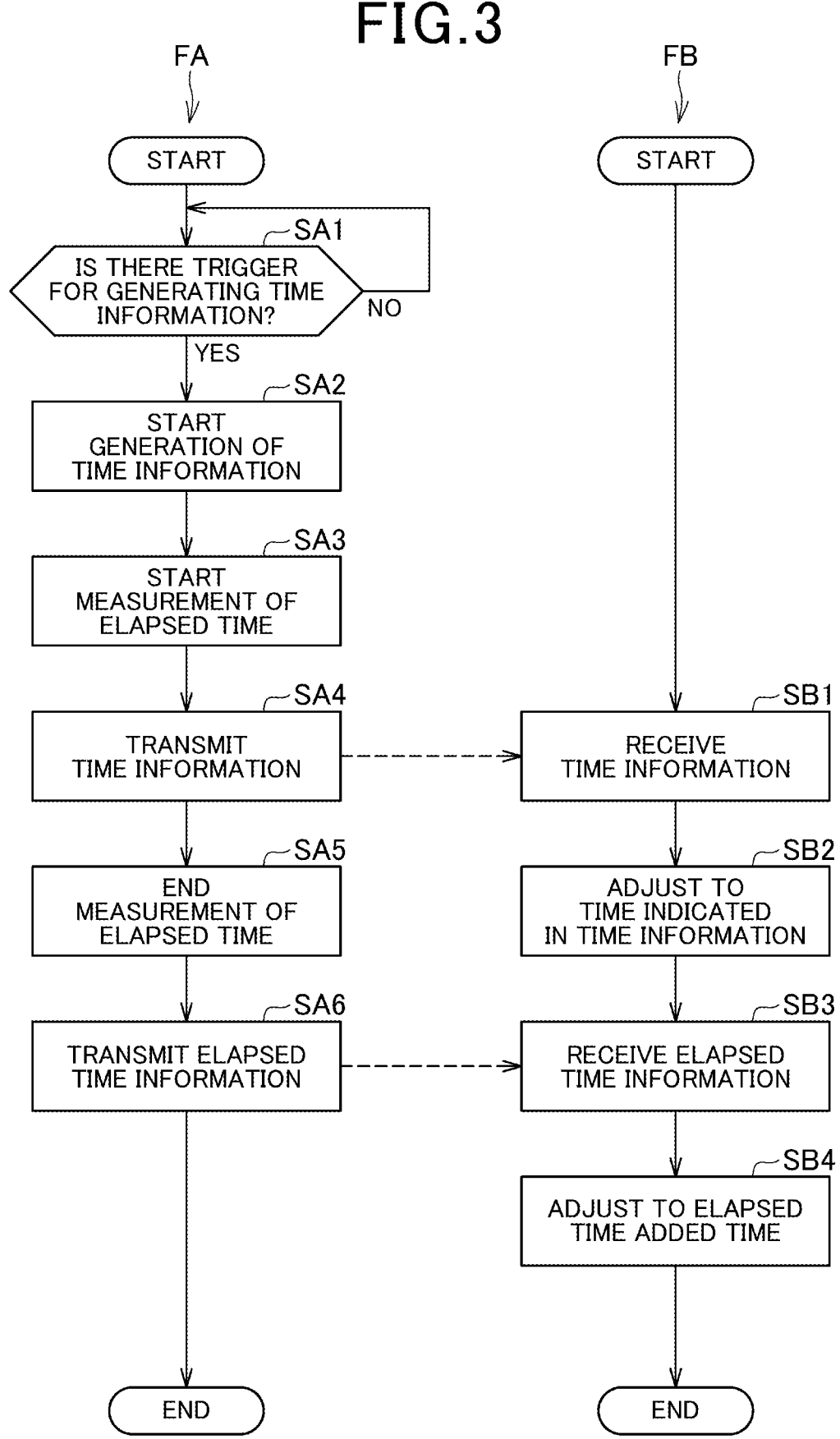
FIG. 3 is a flowchart showing operations of the central ECU and the connection ECU.

FIG. 3 is a flowchart showing the operations of the central ECU 2 and the connection ECU 7. Operations shown in FIG. 3 are operations related to time synchronization. In FIG. 3, a flowchart FA indicates the operations of the central ECU 2, and a flowchart FB indicates the operations of the connection ECU 7.

As indicated in the flowchart FA, the generation unit 204 determines whether there is a trigger for generating the time information J1 (Step SA1). An example of the trigger may be that it has reached a prescribed period.

When determined that there is no such trigger for generating the time information J1 (NO in Step SA1), the generation unit 204 performs determination of Step SA1 again.

In the meantime, when determined that there is a trigger for generating the time information J1 (YES in Step SA1), the generation unit 204 starts generation of the time information J1 (Step SA2).

Then, the measurement unit 205 starts measurement of elapsed time (Step SA3).

Thereafter, the first transmission unit 201 transmits the time information J1 generated by the generation unit 204 to the connection ECU 7 (Step SA4).

Then, the measurement unit 205 ends the measurement of the elapsed time (Step SA5).

Thereafter, the first transmission unit 201 transmits elapsed time information J2 indicating the elapsed time measured by the measurement unit 205 to the connection ECU 7 (Step SA6).

As indicated in the flowchart FB, the second reception unit 702 receives the time information J1 from the central ECU 2 (Step SB1).

Then, the adjustment unit 704 adjusts the time counted by the second timer unit 703 to the time indicated in the time information J1 received in Step SB1 (Step SB2). After the adjustment performed in Step SB2, the second timer unit 703 counts the time from the time indicated in the time information J1 received in Step SB1 as the basis.

Then, the second reception unit 702 receives the elapsed time information J2 from the central ECU 2 (Step SB3).

Thereafter, the adjustment unit 704 adjusts the time counted by the second timer unit 703 to elapsed time added time (Step SB4). Elapsed time added time is the time acquired by adding the elapsed time indicated in the elapsed time information J2 received in Step SB3 to the time that is counted by the second timer unit 703 from the time adjusted in Step SB2 as the basis.

Figure 4:
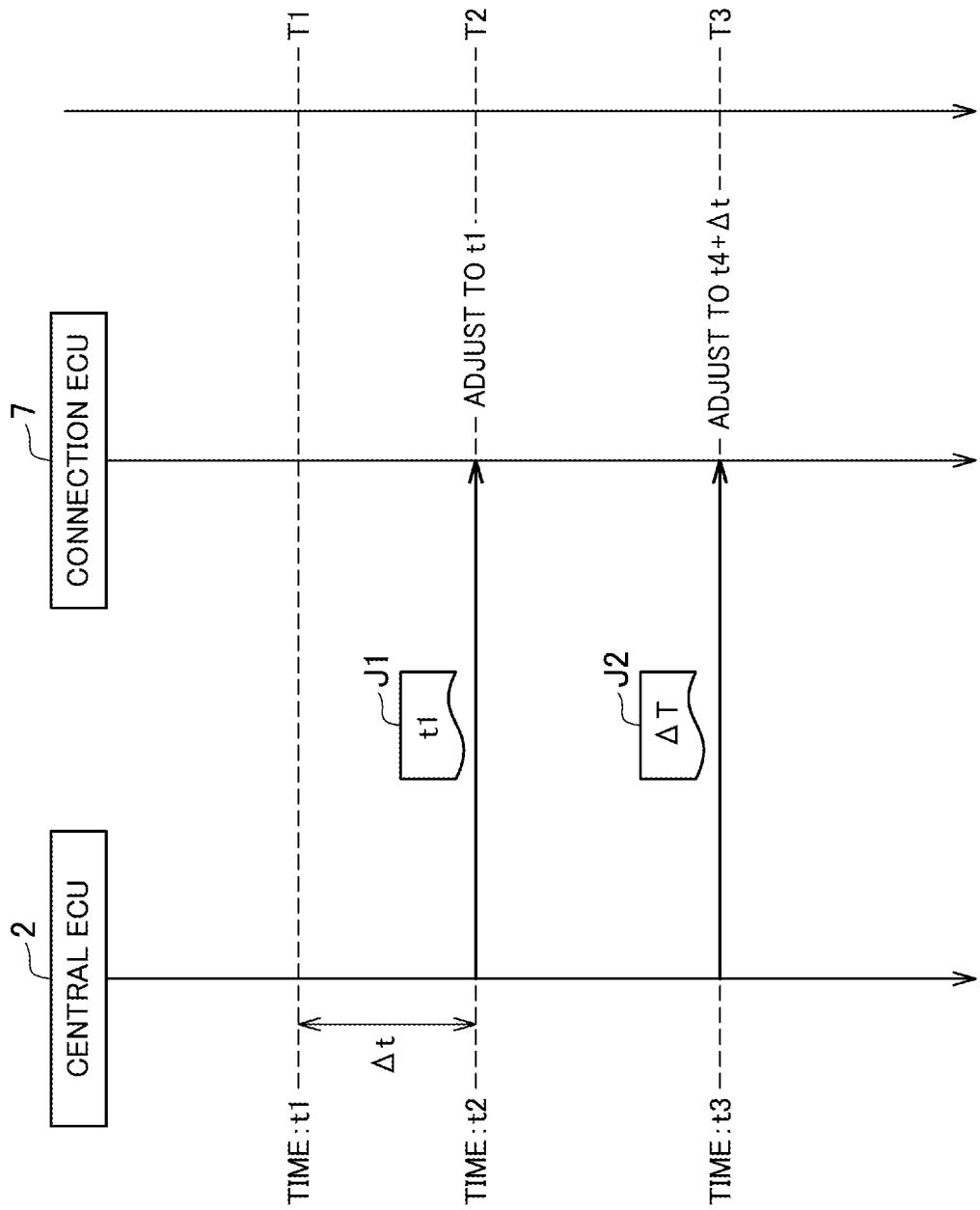
FIG. 4 is a diagram for describing time synchronization in a specific manner.

Referring to FIG. 4, time synchronization between the central ECU 2 and the connection ECU 7 will be described in a specific manner. FIG. 4 is a diagram for describing time synchronization in a specific manner.

At a timing T1, the generation unit 204 of the central ECU 2 starts generation of the time information J1. The timing T1 is the timing of a case where the time counted by the first timer unit 203 is "t1".

At a timing T2, the first transmission unit 201 transmits the time information J1 indicating the start of generation at the timing T1 to the connection ECU 7. The timing T2 is the timing of a case where the time counted by the first timer unit 203 is "t2". The time "t2" is the time advanced by Δt from the time "t1". The time information J1 transmitted at the timing T2 indicates "t1" that is the time at which generation is started.

When the second reception unit 702 receives the time information J1 at the timing T2, the adjustment unit 704 of the connection ECU 7 adjusts the time counted by the second timer unit 703 to the time "t1" that is indicated in the time information received by the second reception unit 702. After the adjustment, the second timer unit 703 counts the time from the time "t1" as the basis.

At a timing T3, the generation unit 204 of the central ECU 2 transmits the elapsed time information J2 to the connection ECU 7. The timing T3 is the timing in a case where the time counted by the first timer unit 203 is time "t3". The time "t3" is the timing advanced further from the time "t2". The elapsed time information J2 transmitted at the timing T3 indicates the elapsed time of "Δt". In FIG. 4, "Δt" is the elapsed time acquired by subtracting the time "t1" from the time "t2".

When the second reception unit 702 receives the elapsed time information J2 at the timing T3, the adjustment unit 704 of the connection ECU 7 adjusts the time counted by the second timer unit 703 to time "t4+Δt". The time "t4+Δt" is the elapsed time added time. The time "t4" indicates the time counted by the second timer unit 703 from the adjusted time "t1" as the basis to the timing T3.

Next, operations of the connection ECU 7 when the time counted by the second timer unit 703 is adjusted to the elapsed time added time will be described.

FIG. 5 is a flowchart indicating the operations of the connection ECU 7. The operations shown in FIG. 5 are triggered upon the fact that the adjustment unit 704 has adjusted the time counted by the second timer unit 703 to the elapsed time added time.

The second transmission unit 701 determines whether a communication bus different from the communication bus that is connected to the central ECU 2 is connected (Step SC1). As described above, from the viewpoint of the terminal ECU 6, the second communication bus 5 is connected to the central ECU 2 via the zone ECU 4 and the first communication bus 3. In the meantime, from the viewpoint of the zone ECU 4, the second communication bus 5 is not connected to the central ECU 2. Thus, determination made in Step SC1 in other words is determination whether the ECU itself is the terminal ECU 6. Determination in Step SC1 is made by referring to data in which whether a communication bus different from the communication bus that is connected to the central ECU 2 is connected is recorded, for example. Such data is stored in the second memory 71.

When determined that a communication bus different from the communication bus that is connected to the central ECU 2 is connected (YES in Step SC1), the second transmission unit 701 ends the present processing. That is, when the actor of the operations in FIG. 5 is the zone ECU 4, the second transmission unit 701 determines as positive in Step SC1.

In the meantime, when determined that no communication bus different from the communication bus that is connected to the central ECU 2 is connected (NO in Step SC1), the second transmission unit 701 transmits adjustment completion information to the central ECU 2 (Step SC2). The adjustment completion information is the information indicating that adjustment of the time has completed. When the actor of the operations in FIG. 5 is the terminal ECU 6, the second transmission unit 701 determines as negative in Step SC1, and transmits the adjustment completion information.

By the operations of FIG. 5, the central ECU 2 comes to be able to grasp that time synchronization in the terminal ECU 6 is completed. In the vehicle control system 1, the ECUs are connected in order of the central ECU 2, the ZONE ECU 4, and the terminal ECU 6. Thus, when time synchronization is completed in the terminal ECU 6, it is considered that time synchronization is completed through the whole system. Therefore, by transmitting the adjustment completion information from the terminal ECU 6 to the central ECU 2, the central ECU 2 becomes capable of grasping whether time synchronization is completed through the whole system.

2. Second Embodiment

Next, a second embodiment will be described.

In the description of the second embodiment, same reference signs are applied to the structural elements that are same as those of each unit of the vehicle control system 1 according to the first embodiment, and detailed explanations thereof are omitted as appropriate.

In the second embodiment, the connection ECU 7 stores the received elapsed time information J2, and performs time synchronization based on the stored elapsed time information J3.

In the second embodiment, upon receiving the elapsed time information J2 from the central ECU 2, the second reception unit 702 stores the received elapsed time information J2 in the second memory 71. Then, when the elapsed time information J2 is stored in the second memory 71, the second transmission unit 701 transmits stop information to the central ECU 2. The stop information is the information for stopping transmission of the elapsed time information J2. When the central ECU 2 receives the stop information, the measurement unit 205 stops measurement of the elapsed time. Furthermore, when the central ECU 2 receives the stop information, the first transmission unit 201 transmits the time information J1 but does not transmit the elapsed time information J2 even when there is a trigger for generating the time information J1.

After transmitting the stop information, that is, after storing the elapsed time information J2, when the second reception unit 702 receives the time information J1 again from the central ECU 2, the adjustment unit 404 adjusts the time counted by the second timer unit 703 as in the case of the first embodiment based on the time information J1 received again and the elapsed time information J2 stored in the second memory 71.

3. Another Embodiment

Each of the embodiments described above merely indicates one aspect, and modification and application thereof are possible as desired.

In the embodiments described above, the connection ECU 7 is presented as a "second electronic device" of the present disclosure. However, the "second electronic device" of the present disclosure may be an ECU which is directly connected to the central ECU 2 and to which no ECU other than the central ECU 2 is connected. As examples of such an ECU, there may be an IVI (In-Vehicle Infotainment) ECU, a rear camera, a touch panel, a meter panel, a TCU (Telematics Control Unit), and a V2X (Vehicle to Everything) communication device.

In the embodiments described above, there is a single zone ECU 4 that is connected to the central ECU 2. However, there may be a plurality of zone ECUs 4 that are connected to the central ECU 2. This is also the same for the terminal ECU 6.

The second embodiment described above is configured such that, when the central ECU 2 once transmits the elapsed time information J2, retransmission of the elapsed time information J2 is not performed. Another embodiment may be configured such that, when a trigger for generating the time information J1 occurs for a prescribed number of times or more, measurement of the elapsed time and transmission of the elapsed time information J2 are executed again by cancelling the stop executed based on the stop information. In a case of such a configuration, upon receiving the elapsed time information J2 again, the connection ECU 7 adjusts the time counted by the second timer unit 703 based on the latest received elapsed time information J2, and updates the elapsed time information J2 stored in the second memory 71 to the latest received elapsed time information J2.

The first processor 20 and the second processor 70 may be configured with a plurality of processors or may be configured with a single processor. Those processors may also be hardware programmed to implement the above-described functional units. In that case, those processors may be configured with ASIC (Application Specific Integrated Circuit) or FPGA (Field Programmable Gate Array), for example.

Furthermore, the configurations of each of the units of the vehicle control system 1 shown in FIG. 1 is presented as an example only, and there is no specific limit set for the concrete implementation forms thereof. That is, hardware individually corresponding to each of the units does not necessarily need to be mounted, and it is certainly possible to implement functions of each of the units by executing a program by a single processor. Furthermore, part of the functions implemented by software in the embodiments described above may be configured with hardware, or part of the functions implemented by hardware may be implemented by software.

Furthermore, step units of the operations shown in FIG. 3 are divided in accordance with the main processing contents, and the present disclosure is not limited by the manner the processing units are divided and the names thereof. The operations may be divided into a greater number of step units in accordance with the processing contents. Furthermore, a single step unit may be divided to include more processing. Moreover, the order of the steps may be changed as appropriate without departing from the scope of the present disclosure.

Furthermore, when a control method of the above-described vehicle control system 1 is to be implemented by using a processor, the program to be executed by the processor can be configured with a mode of recording medium or a mode of transmission medium that transmits the program. That is, the first control program 211 can also be implemented in a state where the first control program 211 is recorded on a removable information recording medium. While examples of the information recording medium may be a magnetic recording medium such as a hard disk, an optical recording medium such as a CD, and semiconductor memory devices such as a USB (Universal Serial Bus) memory and an SSD (Solid State Drive), it is also possible to use other recording media. Moreover, as in the case of the first control program 211, the second control program 711 can be implemented in a state where the second control program 711 is recorded on a removable information recording medium.

4. Configuration Supported by the Embodiments

The above-described embodiments support the following configurations.

(Configuration 1) A vehicle control system including a first electronic device and a second electronic device connected to the first electronic device, in which the first electronic device includes: a first timer unit; a generation unit that generates time information indicating time counted by the first timer unit; and a first transmission unit that transmits the time information generated by the generation unit to the second electronic device, the first transmission unit also transmitting, to the second electronic device, elapsed time information indicating elapsed time from when the generation unit starts generation of the time information till transmitting the time information generated, and the second electronic device includes: a second timer unit; a reception unit that receives the time information and the elapsed time information; and an adjustment unit that adjusts time counted by the second timer unit based on the time information and the elapsed time information received by the reception unit.

According to the vehicle control system of Configuration 1, the time counted by the second electronic device can be adjusted by considering the elapsed time from the start of generation of the time information till transmission of the time information, so that it is possible to implement time synchronization between the electronic devices with high precision. Furthermore, according to the vehicle control system of Configuration 1, time synchronization between the electronic devise can be implemented with high precision by transmitting the information from the first electronic device, so that no round-trip communication between the electronic devices is necessary, thereby making it possible to decrease the communication frequency related to time synchronization.

(Configuration 2) The vehicle control system according to Configuration 1, in which the adjustment unit adjusts the time counted by the second timer unit based on time acquired by adding the time indicated in the time information and the elapsed time indicated in the elapsed time information.

According to the vehicle control system of Configuration 2, the time counted by the second timer unit is adjusted based on the time acquired by adding the time indicated in the time information and the elapsed time indicated in the elapsed time information, so that it is possible to synchronize the time counted by the second electronic device with the time counted by the first electronic device with high precision. This makes it possible to implement time synchronization between the electronic devices with still higher precision.

(Configuration 3) The vehicle control system according to Configuration 1 or 2, in which the second electronic device includes a storage unit that stores the elapsed time information received by the reception unit, and when the reception unit receives the time information after receiving the elapsed time information, the adjustment unit adjusts the time counted by the second timer unit based on the time information received by the reception unit and the elapsed time information stored in the storage unit.

According to the vehicle control system of Configuration 3, by storing the elapsed time information received from the first electronic device, time synchronization for the next time and thereafter can be implemented with high precision only by receiving the time information. This makes it possible to implement time synchronization between the electronic devices with high precision and to decrease the communication frequency between the electronic devices.

(Configuration 4) The vehicle control system according to any one of Configurations 1 to 3, in which the second electronic device includes a second transmission unit that transmits adjustment completion information indicating completion of time adjustment to the first electronic device after the time counted by the second timer unit is adjusted, when the second electronic device is not connected to a communication bus different from a communication bus that is connected to the first electronic device.

According to the vehicle control system of Configuration 4, the second electronic device transmits the adjustment completion information to the first electronic device, so that the first electronic device can grasp the timing at which time synchronization is completed through the whole system.

(Configuration 5) The vehicle control system according to any one of Configurations 1 to 4, in which the first electronic device and the second electronic device communicate with each other according to CAN standards.

According to the vehicle control system of Configuration 5, it is possible to implement time synchronization between the electronic devices with high precision, even when the first electronic device and the second electronic device communicate with each other according to the CAN standards. Therefore, time synchronization can be implemented between the electronic devices with high precision while achieving cost reduction of the vehicle control system.

(Configuration 6) A control method of a vehicle control system including a first electronic device and a second electronic device connected to the first electronic device, the control method including: generating, by the first electronic device, time information indicating time counted by the first electronic device; transmitting, by the first electronic device, the time information generated to the second electronic device; transmitting, by the first electronic device, to the second electronic device, elapsed time information indicating elapsed time from start of generation of the time information till transmission of the time information generated; receiving, by the second electronic device, the time information and the elapsed time information; and adjusting, by the second electronic device, time to be counted based on the time information and the elapsed time information received.

According to the control method of the vehicle control system of Configuration 6, the same effect as that of the vehicle control system of Configuration 1 can be achieved.

(Configuration 7) An electronic device provided in a vehicle, the electronic device including: a timer unit; a generation unit that generates time information indicating time counted by the timer unit; and a transmission unit that transmits the time information generated by the generation unit to another electronic device, the transmission unit also transmitting, to the another electronic device, elapsed time information indicating elapsed time from when the generation unit starts generation of the time information till transmitting the time information generated.

According to the electronic device of Configuration 7, it becomes possible for another electronic device to adjust the time to be counted by considering the elapsed time from the start of generation of the time information till transmission of the time information. Therefore, time synchronization can be implemented between the electronic devices with high precision.

(Configuration 8) A non-transitory computer readable recording medium recording a program causing a processor of an electronic device provided in a vehicle to function as: a timer unit; a generation unit that generates time information indicating time counted by the timer unit; and a transmission unit that transmits the time information generated by the generation unit to another electronic device, the transmission unit also transmitting, to the another electronic device, elapsed time information indicating elapsed time from when the generation unit starts generation of the time information till transmitting the time information generated.

According to the recording medium of Configuration 8, the same effect as that of the electronic device of Configuration 7 can be achieved.

REFERENCE SIGNS LIST

1 Vehicle control system
2 Central ECU (first electronic device, electronic device)
3 First communication bus
4 Zone ECU (second electronic device, another electronic device)
5 Second communication bus
6 Terminal ECU (second electronic device, another electronic device)
7 Connection ECU (second electronic device, another electronic device)
20 First processor (processor)
21 First memory
22 First communication unit
70 Second processor
71 Second memory (storage unit)
72 Second communication unit
201 First transmission unit (transmission unit)
202 First reception unit
203 First timer unit (timer unit)
204 Generation unit 205 Measurement unit
211 First control program (program)
701 Second transmission unit
702 Second reception unit (reception unit)
703 Second timer unit
704 Adjustment unit
711 Second control program
J1 Time information
J2 Elapsed time information
V Vehicle

What is claimed is:

1. A vehicle control system comprising a first electronic device and a second electronic device connected to the first electronic device, wherein
the first electronic device comprises a first processor that includes:
a first timer unit;
a generation unit that generates time information indicating time counted by the first timer unit; and
a first transmission unit that transmits the time information generated by the generation unit to the second electronic device, the first transmission unit also transmitting, to the second electronic device, elapsed time information indicating elapsed time from when the generation unit starts generation of the time information till transmitting the time information generated, and
the second electronic device comprises a second processor that includes:
a second timer unit;
a reception unit that receives the time information and the elapsed time information;
an adjustment unit that adjusts time counted by the second timer unit based on the time information and the elapsed time information received by the reception unit; and
a second transmission unit that transmits adjustment completion information indicating completion of time adjustment to the first electronic device after the time counted by the second timer unit is adjusted when the second electronic device is not connected to a communication bus different from a communication bus that is connected to the first electronic device, and the second transmission unit does not transmit the adjustment completion information to the first electronic device when the second electronic device is connected to the communication bus different from the communication bus that is connected to the first electronic device.

2. The vehicle control system according to claim 1, wherein the adjustment unit adjusts the time counted by the second timer unit based on time acquired by adding the time indicated in the time information and the elapsed time indicated in the elapsed time information.

3. The vehicle control system according to claim 1, wherein
the second electronic device comprises a memory that stores the elapsed time information received by the reception unit, and
when the reception unit receives the time information after the elapsed time information is stored in the memory, the adjustment unit adjusts the time counted by the second timer unit based on the time information received by the reception unit and the elapsed time information stored in the memory.

4. The vehicle control system according to claim 1, wherein the first electronic device and the second electronic device communicate with each other according to CAN standards.

5. A control method of a vehicle control system comprising a first electronic device and a second electronic device connected to the first electronic device, the control method comprising:
generating, by the first electronic device, time information indicating time counted by the first electronic device;
transmitting, by the first electronic device, the time information generated to the second electronic device;
transmitting, by the first electronic device, to the second electronic device, elapsed time information indicating elapsed time from start of generation of the time information till transmission of the time information generated;
receiving, by the second electronic device, the time information and the elapsed time information;
adjusting, by the second electronic device, time to be counted based on the time information and the elapsed time information received; and
transmitting adjustment completion information indicating completion of time adjustment to the first electronic device after the time to be counted is adjusted when the second electronic device is not connected to a communication bus different from a communication bus that is connected to the first electronic device, and not transmitting the adjustment completion information to the first electronic device when the second electronic device is connected to the communication bus different from the communication bus that is connected to the first electronic device.

6. A vehicle control system comprising a first electronic device and a second electronic device connected to the first electronic device, wherein
the first electronic device comprises a first processor that includes:
a first timer unit;
a generation unit that generates time information indicating time counted by the first timer unit; and
a first transmission unit that transmits the time information generated by the generation unit to the second electronic device, the first transmission unit also transmitting, to the second electronic device, elapsed time information indicating elapsed time from when the generation unit starts generation of the time information till transmitting the time information generated, and
the second electronic device comprises a second processor that includes:
a second timer unit;
a reception unit that receives the time information and the elapsed time information; and
an adjustment unit that adjusts time counted by the second timer unit based on the time information and the elapsed time information received by the reception unit,
the adjustment unit adjusts the time counted by the second timer unit based on time acquired by adding the time indicated in the time information and the elapsed time indicated in the elapsed time information.

7. A control method of a vehicle control system comprising a first electronic device and a second electronic device connected to the first electronic device, the control method comprising:

generating, by the first electronic device, time information indicating time counted by the first electronic device;

transmitting, by the first electronic device, the time information generated to the second electronic device;

transmitting, by the first electronic device, to the second electronic device, elapsed time information indicating elapsed time from start of generation of the time information till transmission of the time information generated;

receiving, by the second electronic device, the time information and the elapsed time information; and adjusting, by the second electronic device, time to be counted based on time acquired by adding the time indicated in the time information and the elapsed time indicated in the elapsed time information received.

* * * * *